US012748871B2

(12) United States Patent
Zhang et al.

(10) Patent No.: US 12,748,871 B2
(45) Date of Patent: Sep. 29, 2026

(54) RESOURCE MANAGEMENT METHOD, COMPUTING DEVICE, COMPUTING EQUIPMENT, AND READABLE STORAGE MEDIUM

(71) Applicant: Phytium Technology Co., Ltd., Tianjin (CN)

(72) Inventors: Ming Zhang, Tianjin (CN); Yanzhao Feng, Tianjin (CN); Yufeng Guo, Tianjin (CN); Qingshan Zhu, Tianjin (CN); Zhuo Ma, Tianjin (CN); Zhiqiang Chen, Tianjin (CN); Jianyue Wang, Tianjin (CN)

(73) Assignee: PHYTIUM TECHNOLOGY CO., LTD., Tianjin (CN)

( * ) Notice: Subject to any disclaimer, the term of this patent is extended or adjusted under 35 U.S.C. 154(b) by 325 days.

(21) Appl. No.: 17/991,644

(22) Filed: Nov. 21, 2022

(65) Prior Publication Data

US 2023/0177196 A1 Jun. 8, 2023

(30) Foreign Application Priority Data

Nov. 24, 2021 (CN) ......................... 202111398406.6

(51) Int. Cl.
*G06F 21/62* (2013.01)

(52) U.S. Cl.
CPC ................................ *G06F 21/6218* (2013.01)

(58) Field of Classification Search
CPC ...... G06F 21/6218; G06F 21/57; G06F 21/72; G06F 21/77; G06F 21/85; H04L 9/0897
See application file for complete search history.

(56) References Cited

U.S. PATENT DOCUMENTS

| | | | | |
|---|---|---|---|---|
| 11,250,135 | B1 * | 2/2022 | Zhang | G06F 21/44 |
| 2005/0143146 | A1 | 6/2005 | Kim | |
| 2016/0266943 | A1 * | 9/2016 | Hans | G06F 9/54 |
| 2021/0216306 | A1 * | 7/2021 | Moeller | G06F 8/656 |
| 2021/0326489 | A1 * | 10/2021 | Kee | G06F 13/1684 |
| 2021/0334222 | A1 * | 10/2021 | Wood | G06F 21/79 |

(Continued)

FOREIGN PATENT DOCUMENTS

CN 110990331 A 4/2020

OTHER PUBLICATIONS

M. Haakman et al. AI lifestyle models need to be revised. An exploratory study in Fintech. Empirical Software Engineering, v.26, p. 95 (Year: 2021).*

(Continued)

*Primary Examiner* — Lynn D Feild
*Assistant Examiner* — Ladimir I Gavrilenko
(74) *Attorney, Agent, or Firm* — ANOVA LAW GROUP, PLLC

(57) ABSTRACT

A resource management method suitable for a security architecture system including a secure element subsystem. The security architecture system is configured with N chip lifecycle states, N being an integer greater than 1, the secure element subsystem stores a plurality of resources, an access authority of the resources being associated with the N chip lifecycle states. The method includes performing access control on a resource based on a current chip lifecycle state of the security architecture system, the current chip lifecycle state of the security architecture system belonging to one of the N chip lifecycle states.

16 Claims, 5 Drawing Sheets

(56) References Cited

U.S. PATENT DOCUMENTS

| | | | | |
|---|---|---|---|---|
| 2022/0269825 | A1* | 8/2022 | Stratan | G06F 21/31 |
| 2022/0405092 | A1* | 12/2022 | Miedema | G06F 8/60 |
| 2024/0005013 | A1* | 1/2024 | Stratan | G06F 21/74 |

OTHER PUBLICATIONS

D. Amalfitano et al. A model-driven engineering approach to supporting questionnaire-based gap analysis processes through application lifecycle management systems. Software Quality Journal, v. 28, p. 535 (Year: 2020).*

I. Mugarza et al., Security issues and software updates management in the Industrial Internet of Things (IIoT) era. Review, Sensors, v. 20, p. 7160 (Year: 2020).*

* cited by examiner

RESOURCE MANAGEMENT METHOD, COMPUTING DEVICE, COMPUTING EQUIPMENT, AND READABLE STORAGE MEDIUM

CROSS-REFERENCE TO RELATED APPLICATION

This application claims priority to Chinese Application No. 202111398406.6, filed on Nov. 24, 2021, the entire content of which is incorporated herein by reference.

TECHNICAL FIELD

The present disclosure is related to the technical field of processors and, more specifically, to a resource management method, a computing device, a computing equipment, and a readable storage medium.

BACKGROUND

With the increasing demand for security, security technologies are gradually applied to various computing equipment. In particular, security chip technology has become an important part of the security architecture system in computing equipment. Generally, the security architecture system of the computing equipment can include a secure element (SE) subsystem, which is used to build a secure computing environment. Generally, important resources such as root keys and other information are stored in the SE subsystem. Because of the importance of such resources, there is a need to ensure the security of the computing environment at all stages of the computing equipment from production to use.

SUMMARY

In accordance with the disclosure, embodiments of the present application provide a resource management method suitable for a security architecture system including a secure element subsystem. The secure element subsystem stores a plurality of resources, and the security architecture system is configured with N chip lifecycle states, N being an integer greater than 1. The access authority of the resources is associated with the N chip lifecycle states. The method includes performing access control on a resource based on a current chip lifecycle state of the security architecture system, the current chip lifecycle state of the security architecture system belonging to one of the N chip lifecycle states.

Further in accordance with the disclosure, embodiments of the present application provide a computing device including a security architecture system. The security architecture system includes a secure element subsystem. The secure element subsystem stores a plurality of resources, and the security architecture system is configured with N chip lifecycle states, N being an integer greater than 1. The access authority of the resources is associated with the N chip lifecycle states. The computing device includes a processing unit, the processing unit being configured to perform access control on a resource based on a current chip lifecycle state of the security architecture system, the current chip lifecycle state of the security architecture system belonging to one of the N chip lifecycle states.

Further in accordance with the disclosure, embodiments of the present application provide a computing equipment including a security architecture system. The security architecture system includes a secure element subsystem, and the secure element subsystem stores a plurality of resources. The security architecture system is configured with N chip lifecycle states, N being an integer greater than 1. The access authority of the resources is associated with the N chip lifecycle states. The computing equipment includes a processor; and a memory storing computer-readable program instructions. When the computer-readable program instructions are being executed by the processor, the processor is caused to perform access control on a resource based on a current chip lifecycle state of the security architecture system, the current chip lifecycle state of the security architecture system belonging to one of the N chip lifecycle states.

Further in accordance with the disclosure, embodiments of the present application provide a non-transitory computer-readable storage medium having instructions stored in the non-transitory computer-readable storage medium that, when being executed by a processor, cause the processor to perform a resource management method suitable for a security architecture system. The security architecture system includes a secure element subsystem, and the secure element subsystem stores a plurality of resources. The security architecture system is configured with N chip lifecycle states, N being an integer greater than 1. The access authority of the resources is associated with the N chip lifecycle states. The method includes performing access control on a resource based on a current chip lifecycle state of the security architecture system, the current chip lifecycle state of the security architecture system belonging to one of the N chip lifecycle states.

BRIEF DESCRIPTION OF THE DRAWINGS

To clearly illustrate the technical solutions in the embodiments of the present disclosure, the drawings used in the description of the embodiments will be briefly described below. It is obvious that the drawings in the following description are only some embodiments of the present disclosure. For those having ordinary skills in the art, other drawings can be obtained according to these drawings without inventive efforts.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, the singular forms "a," "an," and "the" may be intended to include the plural forms as well, unless the context clearly indicates otherwise. Terms such as "first" and "second" used in the present disclosure do not indicate any sequence, quantity or importance, but they are just used to distinguish different components. Also, terms such as "include" and "comprise" mean that an element or an object appearing prior to the word covers an element or an object or its equivalent listed subsequent to the word, but does not exclude other elements or objects. Terms such as "connect" and "connected to" are not limited to physical or mechanical connection, but can comprise electrical connection, regardless of direct connection or indirect connection, such as by using various connected interfaces and lines to achieve information exchange.

With the increasing security requirements of computing equipment, more and more security technologies are being applied to various computing devices. In particular, cryptographic technology has become an important part of the security architecture system. Cryptography has a variety of uses and is a critical part of many security architecture systems. Security architecture systems can use cryptographic techniques to prevent attackers from gaining access to important data, forging identities, or tampering with documents. Secure management of resources such as keys is critical in any security architecture system. If there are loopholes in the security management of resources, the security environment of the equipment will become very fragile, and important resources, such as payment related data, can easily leak due to external attacks.

Figure 1:
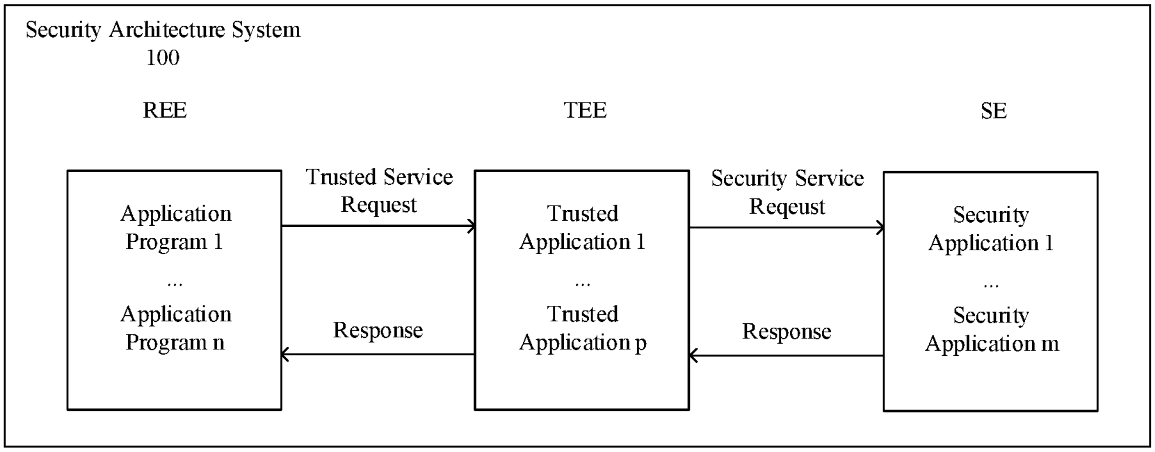
FIG. 1 is a schematic block diagram of a security architecture system.

Generally, the security architecture system of a computing equipment may have three types of subsystems, namely, a rich execution environment (REE) subsystem, a trusted execution environment (TEE) subsystem, and a security element (SE) subsystem. FIG. 1 shows a schematic block diagram of a security architecture system 100. The application running in the REE subsystem can be referred to as a client application (CA), which has low security and is vulnerable to attacks. The application running in the TEE subsystem can be referred to as a trusted application (TA), and its security is higher than the security of the REE, to support functions such as verifying the payment environment in the payment process. The application running in the SE subsystem can be referred to as a secure element application (Applet), and its security is the highest among these three types of subsystems. The system security can be ensured through the cooperation between these three types of subsystems.

Since the SE subsystem has the highest security compared to the REE subsystem and the TEE subsystem, the SE subsystem is generally used to store important resources such as the root key and other information. The security of important resources stored in the SE subsystem needs to be ensured at all stages of the computing equipment from production to use.

Based on this, some embodiments of the present disclosure provide a resource management method to improving the security of resources stored in the SE subsystem and reduce the risk of leakage of important information such as the root key. More specifically, in the source management method provided by some embodiments of the present disclosure, by associating the access authority of the resource stored in the SE subsystem with a set lifecycle state of the chip, the access control of the resource can be performed on the current chip lifecycle state of the security architecture system. Accordingly, important resources such as root keys stored in the SE subsystem have a higher level of security in each life stage of the product, thereby avoiding security risks such as leakage of important information.

In order to describe the technical solutions of the source management method according to some embodiments of the present disclosure more clearly, the security architecture system will be briefly described below with reference to FIG. 1. FIG. 1 is a schematic diagram of a security architecture system including a plurality of subsystems in the related art. The subsystems include the REE subsystem, the TEE subsystem, and the SE subsystem, and the three subsystems may also be referred to as three application environments. It should be understood that the application scenarios of the resource management method described above is not limited to the scenario shown in FIG. 1. In some embodiments, the security architecture system may include only one of the REE subsystem and the TEE subsystem. In other embodiments, the REE subsystem and the TEE subsystem may be implemented as a whole as a subsystem, which is not limited in the embodiments of the present disclosure.

More specifically, the REE subsystem may include a general operating system running on a general-purpose embedded processor, in which application programs, such as application program 1 to application program n, where n is a positive integer, shown in FIG. 1, are installed. In some embodiments, an application program may be a program involving payment scenarios, in which basic services such as browsing items, selecting items, submitting order, etc. are implemented. Although many security measures such as device access control, device data encryption mechanism, application runtime isolation mechanism, and permission verification-based access control are adopted in the REE subsystem, the security of important data in applications cannot be ensured.

The TEE subsystem may be an independent operating environment running outside the general operating system, which can provide trusted service such as the REE subsystem and be isolated from the REE subsystem. That is, the REE subsystem and the applications thereon cannot directly access the hardware and software resources of the TEE subsystem. In the payment scenario described above, the REE subsystem may send a trusted service request to the TEE subsystem, such that the business process can move to the TEE subsystem to realize processes such as verifying the payment environment, displaying the payment information, user inputting the payment key or verifying the fingerprint, etc. Trusted applications, such as trusted applications 1 to trusted application p, where p is a positive integer, shown in FIG. 1, may be executed in the TEE subsystem. The trusted applications provide a trusted operating environment for the REE subsystem, and ensure end-to-end security by maintaining confidentiality and integrity, and controlling the data access authority. In addition, the TEE subsystem may run in parallel with the REE subsystem and interact with the REE subsystem through an application programming interface (API).

The TEE subsystem provides a more security operating environment than the REE subsystem, but cannot provide a secure key storage and key operating environment with hardware-level isolation. Generally, the TEE subsystem can provide many APIs for the REE subsystem, such that the REE subsystem can call the resources of the TEE subsystem. The more APIs the TEE subsystem provides for services, the greater the risk the TEE subsystem will face. It is difficult to ensure that the API itself does not have security risks, such as security vulnerabilities, which will lead to security risks in resources such as keys in the TEE subsystem. Further, a variety of TAs will run on the TEE subsystem, and the TAs are completely dependent on the isolation mechanism provided by the operating system of the TEE subsystem. Without hardware-level isolation, if the TA itself has security vulnerabilities or the TA itself actively accesses the keys or root keys corresponding to other TAs, it will also lead to a greater security risk for sensitive resources such as keys.

A trusted and secure resource storage and computing environment may also be established based on the SE. A security service request may be sent by the TEE subsystem to the SE subsystem to enable the SE subsystem to implement the requested security service. In the payment scenario described above, the security service request may be used to request the root key stored in the SE subsystem to verify the transaction information, such as requesting the payment root key stored in the SE subsystem to verify the payment key input by the user. Generally, the software system in the SE is relatively simple, including fewer hardware components. Therefore, it is easy to establish physical protection and implement security measures, thereby improving the security strength of the SE to serve security systems with higher security requirements. In some embodiments, the security applications, such as security application 1 to security application m, where m is a positive integer, shown in FIG. 1, can be implemented in the SE.

It should be noted that the resource management method provided by the embodiments of the present disclosure can be applied to an application environment with high security requirements, such as managing important resources stored in the SE subsystem. In some embodiments, the application related to the important resources stored in the SE subsystem may be a traditional smart card such as a bank card, a bus card, and a USB shield. The security architecture system implementing the resource management method described above can provide users with services with higher security.

It can be understood that the resource management method provided by some embodiments of the present disclosure can also be applied to other application scenarios that require security management of data, which are not limited in the embodiments of the present disclosure.

Next, an electronic device that can be configured to implement the resource management method provided by some embodiments of the present disclosure will be described below.

The electronic device may be a mobile terminal, a desktop computer, a tablet computer, a personal computer (PC), a personal digital assistant (PDA), a smart watch, a netbook, a wearable electronic device, an augmented reality (AR) device, etc. that can install applications and implement the corresponding application functions. The present disclosure does not limit the specific form of the electronic device.

Figure 2A:
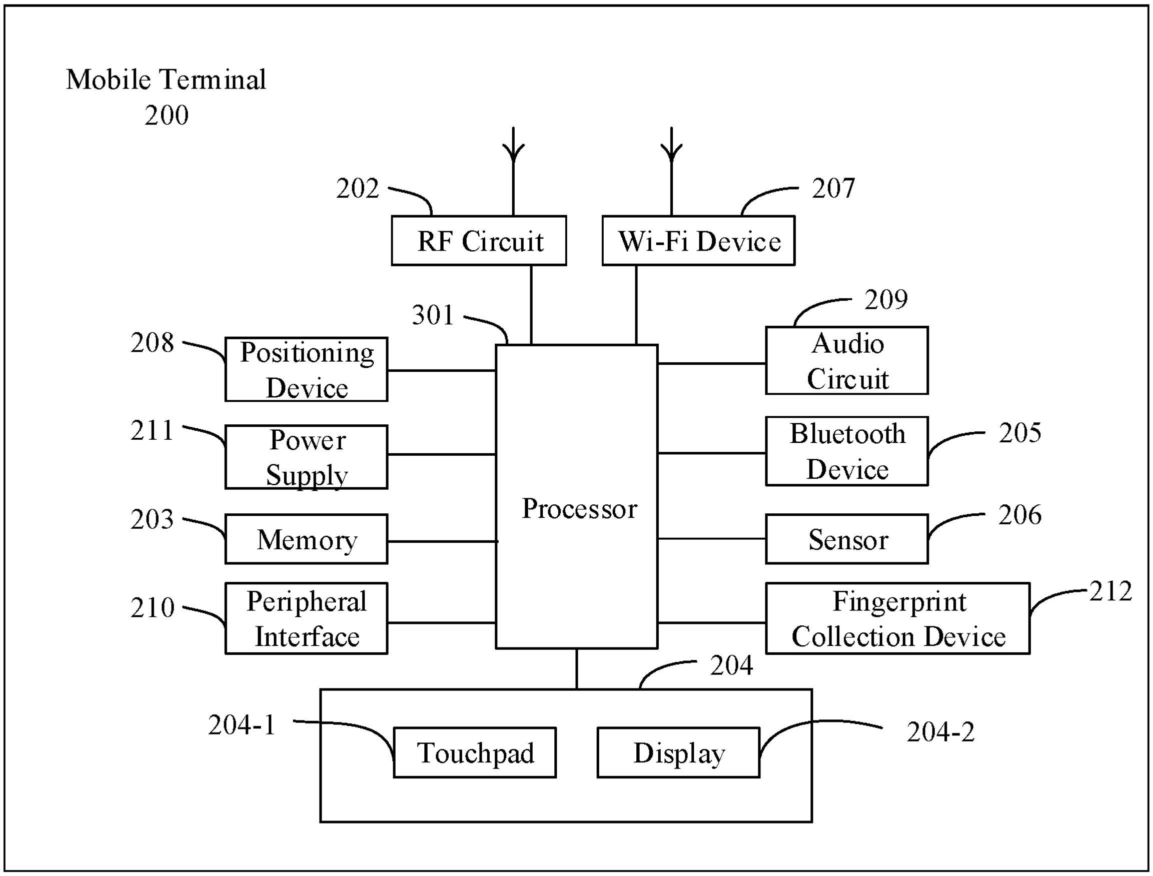
FIG. 2A is a schematic diagram of a terminal device using a resource management method according to an embodiment of the present disclosure.

In some embodiments, the resource management method provided by the embodiments of the present disclosure may be implemented in a mobile terminal 200 as shown in FIG. 2A.

As shown in FIG. 2A, the mobile terminal 200 includes a processor 201, a radio frequency (RF) circuit 202, a memory 203, a touch display screen 204, a Bluetooth device 205, one or more sensors 206, a wireless fidelity (Wi-Fi) device 207, a positioning device 208, an audio circuit 209, a peripheral interface 210, and a power supply 211. These components may communicate vis one or more communication buses or signal lines. Those skilled in the art can understand that the hardware structure shown in FIG. 2A does not constitute a limitation on the mobile terminal. The mobile terminal 200 may include more or less components, combine some components, or arrange the components differently.

Each component of the mobile terminal 200 will be described in detail below with reference to FIG. 2A.

First, the processor 201 is the control center of the mobile terminal 200. The processor 201 may use various interfaces and lines to connect various parts of the mobile terminal 200. The processor 201 may be configured to execute various functions of the mobile terminal 200 and process data by running or executing the application programs stored in the memory 203 and calling the data stored in the memory 203. In some embodiments, the processor 201 may include one or more processing units. For example, the processor 201 may be various types of processor chips.

The RF circuit 202 may be used to receive and transmit wireless signals in the process of sending and receiving information or calling. In particular, the RF circuit 202 may receive the downlink data of the base station, send the data to the processor 201 processing, and send the data related to the uplink to the base station. Generally, the RF circuit may include, but is not limited to, antennas, at least one amplifier, transceivers, couplers, low noise amplifiers, duplexers, etc. In addition, the RF circuit 202 may also communicate with other devices through wireless communication. The wireless communication may use any communication standard or protocol, including but not limited to, global system for mobile communications, general packet radio service, code division multiple access, wideband code division multiple access, long term evolution, email, short message service, etc.

The memory 203 may be used to store application programs and related data. The processor 201 may be configured to perform various functions and data processing of the mobile terminal 200 by running the application programs and the data stored in the memory 203. The memory 203 may include a program storage area and a data storage area. The program storage area can store an operating system and an application program required for at least one function (e.g., an application program for implementing an online shopping function). The data storage area can store data (e.g., products browsing data, order data, etc.) created based on the user of the mobile terminal 200. In addition, the memory 203 may include a high-speed random-access memory (RAM), and may also include a non-volatile memory, such as a magnetic disk storage device, a flash memory device, or other volatile solid-state storage devices. The memory 203 may store various operating systems. The memory 203 may be independent and connected to the processor 201 through a communication bus. In addition, the memory 203 may also be integrated with the processor 201.

The touch display screen 204 may include a touchpad 204-1 and a display 204-2.

In some embodiments, the touchpad 204-1 may be configured to collect touch operations (which can also be referred to as touch events) on or near the user of the mobile terminal 200, and send the collected touch information to other devices (e.g., the processor 201). For example, the user may use any suitable object such as a finger, a stylus, etc. to perform an operation on or near the touchpad 204-1. A user's touch event near the touchpad 204-1 may be referred to as a hovering touch. The hovering touch may indicate that the user does not need to directly touch the touchpad 204-1 in order to select, move, or drag objects (e.g., icons), but the user only needs to be in the vicinity of the device in order to perform the desired function. In addition, various types of resistive, capacitive, infrared, and surface acoustic waves can be used to implement the touchpad 204-1.

The display (which can also be referred to as a display screen) 204-2 may be used to display information input by the user or information provided to the user, and various menus of the mobile terminal 200. The display 204-2 may be configured in the form of a liquid crystal display, an organic light-emitting diode, etc. The touchpad 204-1 may be overlaid on the display 204-2, and when the touchpad 204-1 detects a touch event on or near the touchpad 204-1, the detected event may be sent to the processor 201 to determine the parameters of the touch event. Subsequently, the processor 201 may provide the corresponding output data, for example, a product list, on the display 204-2 based on the parameters of the touch event. Although in FIG. 2A, the touchpad 204-1 and the display 204-2 are used as two independent components to realize the input and output function of the mobile terminal 200. However, in some embodiments, the touchpad 204-1 may be integrated with the display 204-2 to realize the input and output functions of the mobile terminal 200. It should be understood that the touch display screen 204 is formed by stacking multiple layers of materials. Only the touch panel (layer) and the display screen (layer) are shown in FIG. 2A, and other layers are not described in FIG. 2A. In addition, the touchpad 204-1 may be arranged on the front of the mobile terminal 200 in the form of a full panel, and the display 204-2 may also be arranged on the front of the mobile terminal 200, such that a frameless structure can be realized on the front of the terminal device.

Further, the mobile terminal 200 may also include a fingerprint recognition function. For example, a fingerprint collection device 212 may be arranged on the back of the mobile terminal 200 (e.g., under the rear camera), or the fingerprint collection device 212 may be arranged on the front of the mobile terminal 200 (e.g., under the touch display screen 204). In another example, the fingerprint collection device 212 may be arranged in the touch display screen 204 to realize the fingerprint recognition function. That is, the fingerprint collection device 212 may be integrated with the touch display screen 204 to realize the fingerprint recognition function of the mobile terminal 200. Accordingly, the fingerprint collection device 212 may be arranged in the touch display screen 204, and may be a part of the touch display screen 204 or may be arranged in the touch display screen 204 in other ways. The main component of the fingerprint collection device 212 may be a fingerprint sensor, and the fingerprint sensor may adopt any type of sensing technology, including but not limited to optical, capacitive, piezoelectric, or ultrasonic sensing technologies.

The mobile terminal 200 may further include a Bluetooth device 205 for realizing data exchange between the mobile terminal 200 and other short-range devices (e.g., mobile phones, smart watches, etc.). More specifically, the Bluetooth device 205 may be an integrated circuit or a Bluetooth chip.

The mobile terminal 200 may also include at least one sensor 206, such as an optical sensor, a motion sensor, and other sensors. More specifically, the optical sensor may include an ambient light sensor and a proximity sensor. The ambient light sensor can adjust the brightness of the display of the touch display screen 204 based on the brightness of the ambient light. The proximity sensor can turn off the power of the display when the mobile terminal 200 is moved to the ear. As a type of motion sensor, an accelerometer sensor can detect the magnitude of acceleration in all directions (generally three axes), detect the magnitude and direction of gravity when it is stationary. The accelerometer sensor can be used for applications that recognize the attitude of the mobile phone (e.g., horizontal and vertical screen switching, related games, magnetometer attitude calibration), and vibration recognition related functions (e.g., pedometer, tap), etc. The mobile terminal 200 may also be configured with other sensors such as a gyroscope, a barometer, a hygrometer, a thermometer, an infrared sensor, etc., which will not be described in detail here.

The Wi-Fi device 207 can be used to provide the mobile terminal 200 with network access following the Wi-Fi related standard protocol. The mobile terminal 200 may access the Wi-Fi access point through the Wi-Fi device 207, thereby assisting the user to receive and send data, such as sending and receiving emails, browsing the web, and accessing streaming media, etc. This provides the user with wireless broadband Internet access. In other embodiments, the Wi-Fi device 207 may also act as a Wi-Fi wireless access point, and may provide Wi-Fi network access for other devices.

The positioning device 208 may be used to provide the mobile terminal 200 with geographic location information. It should be understood that the positioning device 208 may be a receiver of a positioning system, such as the global positioning system (GPS), the Beidou satellite navigation system, the Russian GLONASS, etc. After receiving the geographic location information sent by the position system, the positioning device 208 may, for example, send the information to the processor 201 for processing, or send the information to the memory 203 for storage. In some embodiments, the positioning device 208 may also be a receiver of an assisted global positioning system (AGPS). The AGPS may act as an auxiliary server to assist the position device 208 to complete ranging and positioning services. Accordingly, the assisted positioning server may provide positioning assistance by communicating with a device such as a positioning device 208 (e.g., a GPS receiver) of the mobile terminal 200 over a wireless communication network. In some embodiments, the positioning device 208 may also be a positioning technology based on a Wi-Fi access point. Since each Wi-Fi access point has a globally unique media access control (MAC) address, when the Wi-Fi is turned on, the terminal device may scan and collect the broadcast signals of the surrounding Wi-Fi access points to obtain the MAC addresses broadcast by the Wi-Fi access points. The terminal device may send the data (e.g., the MAC addresses) that can identify the Wi-Fi access points to a location server through the wireless communication server. The location server may retrieve the geographic location of each Wi-Fi access point, and combine the strength of the Wi-Fi broadcast signal to calculate the geographic location of the terminal device and send it to the positioning device 208 of the terminal device.

The audio circuit 209 may be a speaker and a microphone for providing an audio interface between the user and the mobile terminal 200. On one hand, the audio circuit 209 may convert the received audio data into electrical signals, and transmit the electrical signals to the speaker to convert the electrical signals into sound signals for output. On the other hand, the microphone may convert the collected sound signals into electrical signals, which may be received by the audio circuit 209 to converted into audio data. The audio data may be output to the RF circuit 202 for transmission to, for example, another device, or to the memory 203 for further processing.

The peripheral interface 210 may be used to provide various interfaces for external input/output devices (e.g., keyboards, mouses, external displays, external memories, subscriber identification module cards, etc.). For example, a mouse can be connected through a universal serial bus (USB) interface, and a subscriber identification module (SIM) provided by a telecom provider can be through the metal contacts on the card slot of the SIM. The peripheral interface 210 may be used to couple the external input/output peripherals to the processor 201 and the memory 203.

The mobile terminal 200 may also include a power device 211 (such as a battery and a power management chip) for supplying power to various components. The battery may be logically connected to the processor 201 through the power management chip, such that the functions of charging and discharging management and power consumption management can be realized through the power supply 211.

Although not shown in FIG. 2A, the mobile terminal 200 may further include a camera (a front camera and/or a rear camera), a flash, a pico-projection device, a near field communication (NFC) device, etc., which will not be described in detail here.

The resource management method described in each of the following embodiments can be implemented in the mobile terminal 200 having the hardware structure described above. Nonetheless, it can be understood that the resource management method described herein can also be applied to other suitable computing devices, not limited to the mobile terminal described in conjunction with FIG. 2A.

Figure 2B:
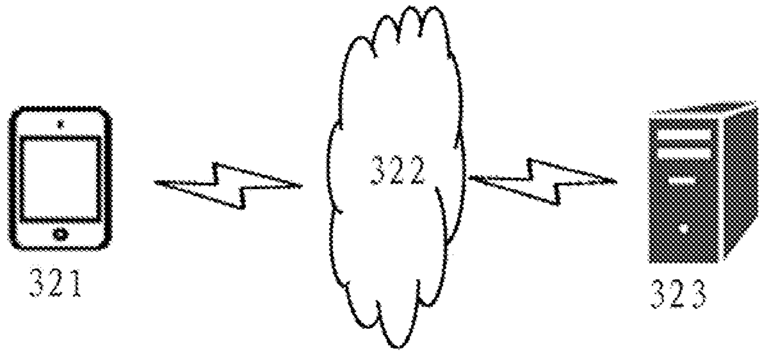
FIG. 2B is a schematic diagram of an application system implementing the source management method according to some embodiments of the present disclosure.

FIG. 2B is a schematic diagram of an application system implementing the resource management method provided by some embodiments of the present disclosure. As shown in FIG. 2B, the application system may include a terminal device 221, a network 222, and a server 223.

The terminal device 221 may be the illustrated mobile terminal or a fixed terminal, configured to perform data transmission with the server 223 through the network 222. Various applications may also be installed on the terminal device 221, such as shopping applications, web browsing applications, video playback applications, news applications, etc. In addition, the terminal device 221 may include an input/output device, such that the terminal device 221 can receive user operations, such as receiving the user's touch and gesture operations through the touch display screen, or receiving the user's voice operation through a microphone. Then, the terminal device 221 may generate a request message based on the received operation. Through the network 222, the terminal device 221 may send the request message to the server 223, and receive the data returned by the server 223 in response to the request message. The terminal device 221 may display based on the data returned by the server 223, for example, display the received display data, such as a video or an image, on the display of the terminal device 221. In addition, the received data may also include other information, such as the display time point and the display duration of the video. Alternatively, the server 223 may also directly send the data to the terminal device 221 without receiving the request message, thereby performing a corresponding processing process on the terminal device 221.

The terminal device 221 may be in the form of hardware or software. When the terminal device 221 is in the form of hardware, it can be various devices that have a display and supports programs running thereon. As described above, the terminal device 221 may be the illustrated mobile terminal, such as the mobile terminal having the components described above in conjunction with FIG. 2A. As other examples, the terminal device 221 may also be a smart TV, a tablet computer, an e-book reader, a moving picture experts group audio layer IV (MP4) player, a laptop computer, a desktop computer, etc. When the terminal device 221 is in the form of software, it may be installed in the electronic devices listed above, and it may be implemented as a plurality of software or software modules (e.g., software or software modules for providing distributed services), or it may be implemented as a single software or software module, which is not limited in the embodiments of the present disclosure.

The network 222 may be a wired network or a wireless network, which is not limited in the embodiments of the present disclosure. The server 223 may be a server that provides various services, such as receiving the data stream sent by the terminal device 221 and performing buffering. In addition, the server 223 may also receive the request message sent by the terminal device 221, analyze the request message, and send the analysis result (e.g., a data stream corresponding to the request message) to the terminal device 221. Different servers may be arranged based on different application types. For example, the server 223 may be an instant message server, a payment application server, an information display application server, a resource management server, etc. It should be understood that the numbers of terminal device 221, network 222, and server 223 shown in FIG. 2B are only illustrative. Based on the application scenarios, there can be any number of terminal devices, networks, and servers.

Hereinafter, the resource management method according to some embodiments of the present disclosure will be described in detail by taking the implementation of resource management in a security architecture system (as shown in FIG. 1) including the three types of subsystems described above as an example. It should be understood that the application scenarios of the resource management method according to some embodiments of the present disclosure are not limited thereto.

The resource management method according to some embodiments of the present disclosure can be applied to a security architecture system including a secure element subsystem. According to some embodiments of the present disclosure, for the security architecture system, N chip lifecycle states can be set, where N is an integer greater than 1. The specific form of the N chip lifecycle states will be described in detail below. In addition, resources can be stored in the secure element subsystem. In some embodiments, the resources may be important information such as the root key corresponding to the chip manufacturer, the root key corresponding to the manufacturer of the whole machine, and the root key corresponding to the user. In order to ensure the security of the above resources, the access authority of the resources can be associated with the N chip lifecycle states set for the security architecture system. It should be understood that the root key here is an example of the important resources stored by the SE subsystem, and other important information can also be stored in the SE subsystem. In addition, the term "root key" is not unique, as long as it can be used as a relatively important key or a related term for deriving other keys.

Figure 3:
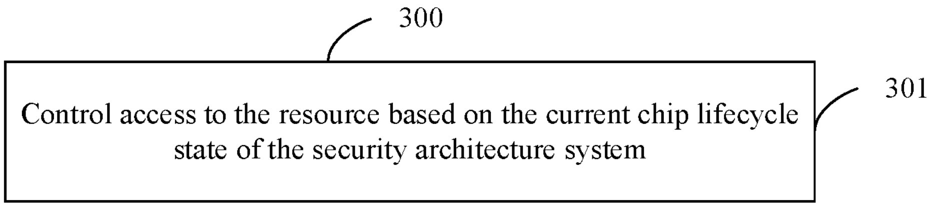
FIG. 3 is a flowchart of the resource management method according to an embodiment of the present disclosure.

FIG. 3 is a flowchart of a resource management method 300 according to an embodiment of the present disclosure. The method will be described in detail below.

301, performing access control on resources based on the current chip lifecycle state of the security architecture system, the current chip lifecycle state of the security architecture system belonging to one of the N chip lifecycle states.

Performing access control on resources may include determining whether to allow to deny access to resources in the SE subsystem in response to the chip lifecycle state the system is currently in. Accordingly, the security of resources stored in the SE can be improved at various stage of the chip.

Through the access control method described above, resources such as the root keys can be isolated from other less secure subsystems such as the REE subsystem and the TEE subsystem. Accordingly, while ensuring the normal implementation of application functions, the use of resources such as the root key can be controlled, thereby avoiding resource leakage during the use of the root key (e.g., payment verification based on the root key etc.).

According to some embodiments of the present disclosure, performing access control on the resource based on the current chip lifecycle state of the security architecture system may include obtaining an access instruction for a resource. Performing access control on the resource may further include determining whether to allow access to the resource based on whether the access authority of the resource's access instruction matches the current chip lifecycle state of the security architecture system. That is, for the resources stored in the SE subsystem, when there is a need to use them, an access instruction for the resources to be used can be sent to the SE subsystem. For example, whether or not to allow access to the resource may be determined by a firmware program in the SE subsystem based on whether the access authority of the access instruction matches the current chip lifecycle state of the security architecture system. If the access authority of the access instruction does not match the current chip lifecycle state of the security architecture system, the access can be denied. The processes for determining whether the access authority of the access instruction matches the chip lifecycle state that the security architecture system is currently in will be described below in conjunction with the specific forms for the N chip lifecycle states.

For example, in some application scenarios involving payment, the basic logic of the business is implemented in the REE subsystem. This logic may include basic processes of browsing products, selecting products, submitting orders, etc. When it is determined that payment is required, the business process will move to the TEE subsystem. Further, the business process may include verifying the payment environment, displaying the payment information, the user inputting the payment key or verifying the fingerprint, etc. Next, the TEE subsystem sends the transaction information the SE subsystem. The SE subsystem signs the transaction and sends the signature to the TEE subsystem. The TEE subsystem directly forwards the signature to the REE subsystem. The REE subsystem completes the interaction with the payment center. In the payment application scenario described above, the SE subsystem signing the transaction may need to use the root key stored in the SE subsystem and associated with the user's payment. Therefore, prior to signing, the SE subsystem needs to determine whether access to the root key is permitted based on whether the access authority to the root key matches the current chip lifecycle state of the security architecture system. If there is a match, the access can be allowed, otherwise, the access can be denied. Accordingly, the security of the root key can be improved based on the lifecycle state of the chip, and the signature operation with potential security can be avoided.

Next, the N chip lifecycle states set by the security architecture system and the access control of resources based on the set chip lifecycle state in some embodiments of the present disclosure will be described.

For a terminal device including a security architecture system, multiple lifecycle states are involved during use. These include the chip manufacturing state, the device manufacturing state, and the user management state. In addition, during use, some faults may be found in the device, and the device needs to be returned to the factory for maintenance. In the multiple lifecycle states of the device described above, the access authority to all or some of the resources stored in the SE subsystem may be different. For example, as described above, the resources stored in the SE subsystem may be the root key corresponding to the chip manufacturer, the root key corresponding to the whole machine manufacturer, and the root key corresponding to the user. The access authorities of the three types of root keys may correspond to the chip manufacturing state, device manufacturing state, and user management state, respectively. That is, the root key corresponding to the chip manufacturer may be written into the SE subsystem by the chip manufacturer during the chip manufacturing state. The root key corresponding to the whole machine manufacturer may be written into the SE subsystem by the whole machine manufacturer during the device manufacturing state. The root key corresponding to the user may be generated by the user during the user management state. Different root keys may be used in different usage states of the device, and there is a need to restrict each lifecycle state to avoid resource leakage without the corresponding access authority. For example, in the user management state, the user generally only has the authority to access the root key corresponding to the user, and does not have the authority to access the root key corresponding to the chip manufacturer or the root key corresponding to the whole machine manufacturer. If the user's access authority to various resources in the SE subsystem is not restricted based on the lifecycle state, the user may be attacked in the process of accessing the root key corresponding to the user and reduce the security of other important resources.

In some embodiments, in order to ensure the security of sensitive resources in the SE subsystem, the N chip lifecycle states may be set as a chip manufacturing state (CM), a device manufacturing state (DM), and a user management state (UM). In addition, according to some embodiments of the present disclosure, considering that the device may need to be returned to the factory for repair due to a fault during use, the chip lifecycle states may further include a DM return state (denoted as DM_RMA) and a CM return state (denoted as CM_RMA). It should be understood that the resource management method provided by the embodiments of the present disclosure is not limited to setting the five chip lifecycle states described above. For example, part of the five chip lifecycle states or more chip lifecycle states may be included based on requirements, and the access authorities of the resources stored in the SE subsystem may be associated with the set chip lifecycle states to achieve access control.

In the present disclosure, the N chip lifecycle states of CM, DM, UM, DM_RMA, and CM_RMA will be used as specific examples. By referring to the resource management method described with these specific examples can be similarly applied to other scenarios, which are not limited in the embodiments of the present disclosure.

As described above, in different lifecycle states, the access authorities to resources in the SE subsystem may be different. For example, in the CM and CM_RMA states, all the debugging permissions of the chip may be turned on. In the DM and DM_RMA states, the debugging interfaces of some internal resources of the chip may be turned off. In the UM state, all the chip debugging interfaces may be turned off. Through the switching of the lifecycle, the chip debugging requirements at various states can be met, and the security of internal resources can be ensured.

According to some embodiments of the present disclosure, the current chip lifecycle state of the security architecture system may be recorded by programming the memory. Accordingly, in the process of using the chip, the currently chip lifecycle state of the security architecture system can be switched in the order of the CM state, the DM state, the UM state, the DM_RMA state, and the CM_RMA state.

That is, for the five chip lifecycle states, by limiting the switching process between the plurality of states described above, the switching can only be performed strictly in the order listed above. The switching cannot jump to the next state or switch back to the previous state. Accordingly, the switching of the chip state is made in line with the use process of the chip, which can prevent the chip from switching from the UM state to the DM state during use, thereby avoiding the leakage of resources that can be accessed in the DM state but cannot be accessed in the UM state.

More specifically, a one-time programming memory (such as OTP/efuse) may be used to record the current chip lifecycle state in a hardware manner. Each bit in the OTP/efuse can only be programmed once. For example, different lifecycle states may be represented by programming different bits to ensure that the lifecycle state will not return to the previous state. Further, in order to ensure the sequential switching of states, each time the OTP/efuse is programmed to record the current lifecycle state, the hardware may automatically detect whether the current lifecycle state is adjacent in sequence to the lifecycle state to be switched to. If the current lifecycle state is adjacent in sequence to the lifecycle state to be switched to, the programming can be allowed, otherwise, the programming request can be discarded. This ensures that the current chip lifecycle state of the security architecture system is switched in the order of the CM state, the DM state, the UM state, the DM_RMA state, and the CM_RMA state.

According to some embodiments of the present disclosure, the resource management method may further include using memory devices, status bits, identifiers, etc. to record the current chip lifecycle state of the security architecture system.

Figure 4:
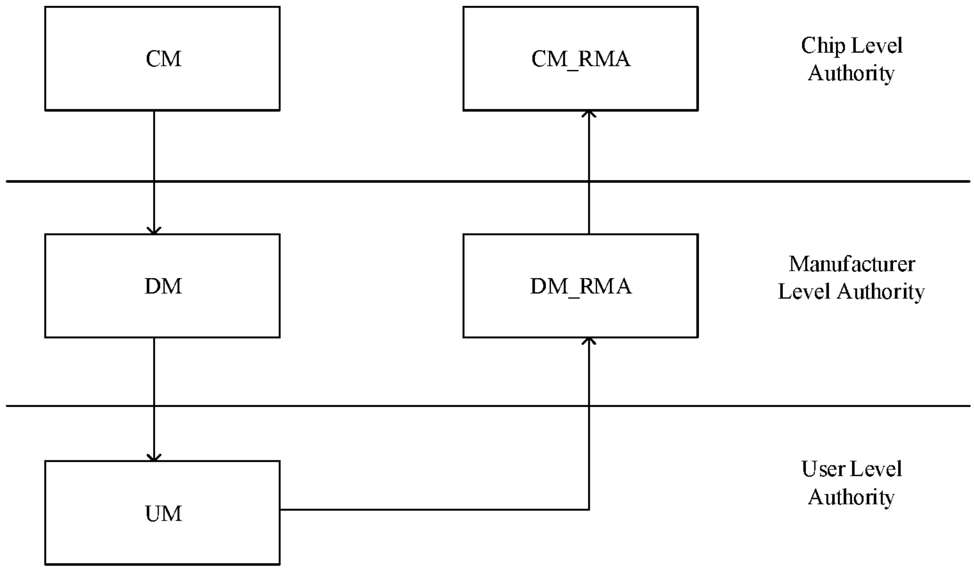
FIG. 4 is a schematic diagram of a lifecycle state switching process according to an embodiment of the present disclosure.

FIG. 4 is a schematic diagram of a lifecycle state switching process according to an embodiment of the present disclosure. As shown in FIG. 4, the five chip lifecycle states will be switched one by one in the order of CM, DM, UM, DM_RMA, and CM_RMA.

According to the embodiments of the present disclosure, the access authorities to the resources stored in the SE subsystem may be associated with the five chip lifecycle states. More specifically, as shown in FIG. 4, the CM and CM_RMA states have the chip-level access authority, the DM and DM_RMA states have the manufacturer-level access authority, and the UM state has the user-level access authority. It can be understood that, for the resources stored in the SE subsystem, the root key corresponding to the chip manufacturer may be written into the SE subsystem by the chip manufacturer during the chip manufacturing state. The root key corresponding to the whole machine manufacturer may be written into the SE subsystem by the whole machine manufacturer during the device manufacturing state. The root key corresponding to the user may be generated by the user during the user management state. Therefore, when the current chip lifecycle state is the UM state, there should be no authority to access the root keys corresponding to the chip manufacturer and the whole machine manufacturer.

Further, according to some embodiments of the present disclosure, the resource management method may further include obtaining a switching instruction for switching the state of the current chip lifecycle state of the security architecture system. The resource management method may further include performing authority switching verification for the switching instruction, and determining whether to perform state switching based on the result of the authority switching verification. Further, the requester of the state switching may also be requested to perform authority verification to ensure the stability of the state switching. For example, for the state switching request to enter the DM_RMA state and the CM_RMA state, authority verification may need to be performed to ensure that only the whole machine manufacturer can switch to the DM_RMA state and only the chip manufacturer can switch to the CM_RMA state. In some embodiments, the switching instruction may be a request signal from another device, and the other device may correspond to a chip manufacturer's device.

In some embodiments, the state switching authority verification may include hardware verification in a one-time programming memory such as OTP/efuse. After receiving a switching request to switch to, for example, DM_RMA state, the requester of the lifecycle state switch may continuously write multiple keys to the address provided by the processor to verify the authority without interruption. The hardware may be configured to automatically compare the multiple keys written by the requester and the verification key stored in the SE subsystem for a match. If there is match, the hardware may correspond to the switch request to switch to, for example, the DM_RMA state, otherwise, the hardware may ignore the switch request to switch the lifecycle state. For example, the verification key used for DM_RMA may be written by the whole machine manufacturer to ensure that only the whole machine manufacturer has the authority to switch to the DM_RMA state.

According to some embodiments of the present disclosure, the security architecture system may include M debugging interfaces. Each debugging interface may be used to access or modify the resources for processing certain components, where M is an integer greater than or equal to 1. In some embodiments, obtaining the access instruction for the resource may include obtaining the access instruction for the resource from a debugging interface belonging to one of the M debugging interfaces. The debugging interface belonging to one of the M debugging interfaces is represented as a current debugging interface. Further, according to some embodiments of the present disclosure, for each chip lifecycle state in the N chip lifecycle states, a debugging interface allowing resource access in the lifecycle state of the chip may be respectively arranged. In some embodiments, determining whether to allow access to a resource based on whether the access authority of the access instruction for the resource match the current chip lifecycle state of the security architecture system may include allowing access to the resource through the current debugging interface if the current debugging interface is a debugging interface that is accessible in the current chip lifecycle state of the security architecture system. Determining whether to allow access to a resource may also include denying access to the resource through the current debugging interface in response to the current debugging interface not being a debugging interface that is accessible in the chip lifecycle state that the security architecture system is currently in.

In the above embodiment, by associating the resource access authority with the current chip lifecycle state through the through the debugging interface, the debugging interface requirements of the chip at different states can be met. The security of the internal resources of the chip can be ensured. Different from the software payment application scenarios described above, the debugging interface may refer to the realization of resource access through the hardware interface. If the resource access authorities of the debugging interfaces are not managed, security attackers may use these debugging interfaces to obtain some internal information during the operation of the chip, resulting in leakage of sensitive information, and other security mechanisms will be compromised. Therefore, through the verification of the current chip lifecycle state, the debugging requirements of the chip can be met, and the security of the security of the internal resources of the chip can be ensured. In addition, existing interfaces are being used to achieve new functions.

For example, in order to facilitate the screening and debugging of the functions of the chip, the chip may need to reserve some debugging interfaces during production. Through these hardware interfaces, each functional unit inside the chip may be scanned to write or read the state of the register, thereby testing and debugging the chip. In some embodiments, the debugging interfaces may include a debugging interface corresponding to the chip manufacturer, which has access to all resources within the chip. In some embodiments, the debugging interfaces may also include a debugging interface corresponding to the whole machine manufacturer. This type of interface may be used as the peripheral debugging interface of the chip core. Compared with the debugging interface corresponding to the chip manufacturer, the debugging interface corresponding to the whole machine manufacturer may only be used to debug some functions of the chip. For example, the debugging interface corresponding to the whole machine manufacturer may not access the root key corresponding to the chip manufacturer, capture request on the bus, etc. In addition, the debugging interfaces may also include a debugging interface corresponding to the user. The user's debugging interface is generally aimed at software function, and the processor core needs to support functions such as breakpoints.

Based on this, access authorities may be set for each debugging interface based on different chip lifecycle states. In some embodiments, in the CM and CM-RMA states, the permission of all debugging interfaces of the chip may be open. In the DM and DM_RMA states, some debugging interfaces for the internal resources of the chip may be closed. In the UM state, all debugging interfaces may be closed. For example, in the DM, DM_RMA, and UM states, some permissions for accessing the debugging interface (e.g., denoted as a first debugging interface) corresponding to the chip manufacturer's root key may be restricted. That is, in the case of receiving an access instruction for the resource via the first debugging interface, the current chip lifecycle state may be determined first. If it is determined that the current chip lifecycle state is the CM state or the CM_RMA state, access to the requested resource through the first debugging interface may be allowed. If it is determined that the rent chip lifecycle state is the DM state, DM_RMA state, or UM state, access to the requested resource through the first debugging interface may be denied. Accordingly, the security in the process of accessing resources through the debugging interface can be ensured. At the same time, since the CM and CM_RMA states are set, the chip debugging function can be implemented based on the first debugging interface in these two states.

According to some embodiments of the present disclosure, for each chip lifecycle state in the N chip lifecycle states, an address range of the resources allowed to be accessed in the chip lifecycle states may be respectively set. In some embodiments, performing access control on the resource based on the current chip lifecycle state of the security architecture system may include allowing access to the resource in response to the resource's address being in the address range of the resource that is allowed to be accessed in the current chip lifecycle state of the security architecture system. Performing access control on the resource may also include denying access to the resource in response to the resource's address not being in the address range of the resource that is allowed to be accessed in the chip lifecycle state that the security architecture system is currently in.

In the above embodiment, the address of the resource that can be access in each chip lifecycle state may be recorded by the firmware in the SE subsystem. Verification may be performed based on the address of the resource being accessed and the current chip lifecycle state. As such performing verification based on the current state in a software manner to improve the security of the accessed resource. For example, the firmware may record the address range of the resources that can be accessed in chip lifecycle state of each chip. If the address of the requested resource is in the address range of the resources that can be accessed in the chip lifecycle state, then access to the requested resource can be allowed.

For example, assume that there are three address ranges for the five chip lifecycle states described above, where the first address range corresponds to the resources that are allowed to be accessed in the CM and the CM_RMA states, the second address range corresponds to the resources that are allowed to be accessed in the DM and the DM_RMA states, and the third address range corresponds to the resources that are allowed to be accessed in the UM state. If the address of the resource corresponding to the access instruction is in the first address range, and the chip lifecycle state is in the DM state, access to the resource based on the access instruction may be denied. More specifically, partial overlapping ranges may exist between the three address ranges, for example, there may be overlapping address ranges between the first address range and the second address range. The content stored in the overlapping address range may indicate that access is allowed during both the CM and CM_RMA states and the DM and the DM_RMA states. In addition, the three address ranges described above may be continuous or discontinuous, and the present disclosure does not limit the specific implementation manner of distinguishing accessible resources at various states based on the address ranges.

In the above embodiment, for the resources stored in the SE subsystem, different address ranges may be used to distinguish the access authorities of the resources. Access control may be implemented in combination with the chip lifecycle state, which can ensure the security of important information in the SE subsystem and avoid unauthorized access.

According to some embodiments of the present disclosure, N resource lifecycle states may be set for the resource. The N resource lifecycle states may correspond to the N chip lifecycle states, where the resource may be set with one or more corresponding resource lifecycle states.

In some embodiments, performing access control on the resource based on the current chip lifecycle state of the security architecture system may include allowing access to the resource if one or more resource lifecycle states corresponding to the resource matching the current chip lifecycle state of the security architecture system. Performing access control on the resource also includes denying access to the resource in response to one or more resource lifecycle states corresponding to the resource not matching the chip lifecycle state that the security architecture system is currently in.

In the above embodiment, the lifecycle state required to access the stored resources in the SE subsystem may be identified, such that the state information set for the resource can match the chip lifecycle state. That is, resource access control may be realized through the consistency of resource lifecycle state and chip lifecycle state to ensure access security.

Take the five chip lifecycle states described above as an example. The resources in the SE subsystem may be identified as one of the resource lifecycle states. For example, the five resource lifecycle states may be respectively represented as the first state, the second state, the third state, the fourth state, and the fifth state. These five resource lifecycle states may correspond to the five chip lifecycle states in a one-to-one relationship. If the identifier of the resource corresponding to the access instruction indicates that the resource corresponds to the first state, and the current chip lifecycle state is in the UM state, then the access to the resource based on the access instruction may be denied.

In the above embodiment, for the resources stored in the SE subsystem, the access authorities of the resources may be distinguished by setting one or more resource lifecycle state corresponding to the resources. Access control may be implemented in combination with the chip lifecycle state, which can ensure the security of important information in the SE subsystem and avoid unauthorized access.

According to some embodiments of the present disclosure, the resource may include a plurality of root keys, and the security architecture system may include the REE subsystem, the TEE subsystem, and the SE subsystem. That is, corresponding to the application scenario shown in FIG. 1. The resource management method according to some embodiments of the present disclosure may include obtaining a key derivation request from the REE subsystem or the TEE subsystem. The key derivation request includes key identifier information, which may be used to request the SE subsystem to perform key derivation by using the root key corresponding to the key identifier information in the plurality of root keys. The method may further include allowing key derivation using the root key corresponding to the key identifier information in response to the access authority for the root key corresponding to the key identifier information matching the current chip lifecycle state. The method may further include denying key derivation using the root key corresponding to the key identifier information in response to the access authority for the root key corresponding to the key identifier information not matching the current chip lifecycle state.

The above embodiment relates to an application scenario in which the REE subsystem or the TEE subsystem requests use of the root key stored in the SE subsystem for key derivation when the security architecture system includes the REE subsystem, the TEE subsystem, and the SE subsystem. In this embodiment, the REE subsystem or the TEE subsystem does not have the authority of directly use the root key stored in the SE subsystem. In scenarios requiring cryptographic operations such as encryption operations and signatures, the REE subsystem or the TEE subsystem needs to send a key derivation request to the SE subsystem to request the SE subsystem to use the root key corresponding to the key identifier information carried in the key derivation request. For the key derivation request, the SE subsystem may first determine the current chip lifecycle state to determine whether the root key being requested matches the current chip lifecycle state, and allow the requested operation if there is a match. For example, assume that the requested root key is the root key corresponding to the chip manufacturer, which can only be accessed in the CM and the CM_RMA states, but the current chip lifecycle state of the system is the UM state, then the key derivation request can be rejected.

Figure 5:
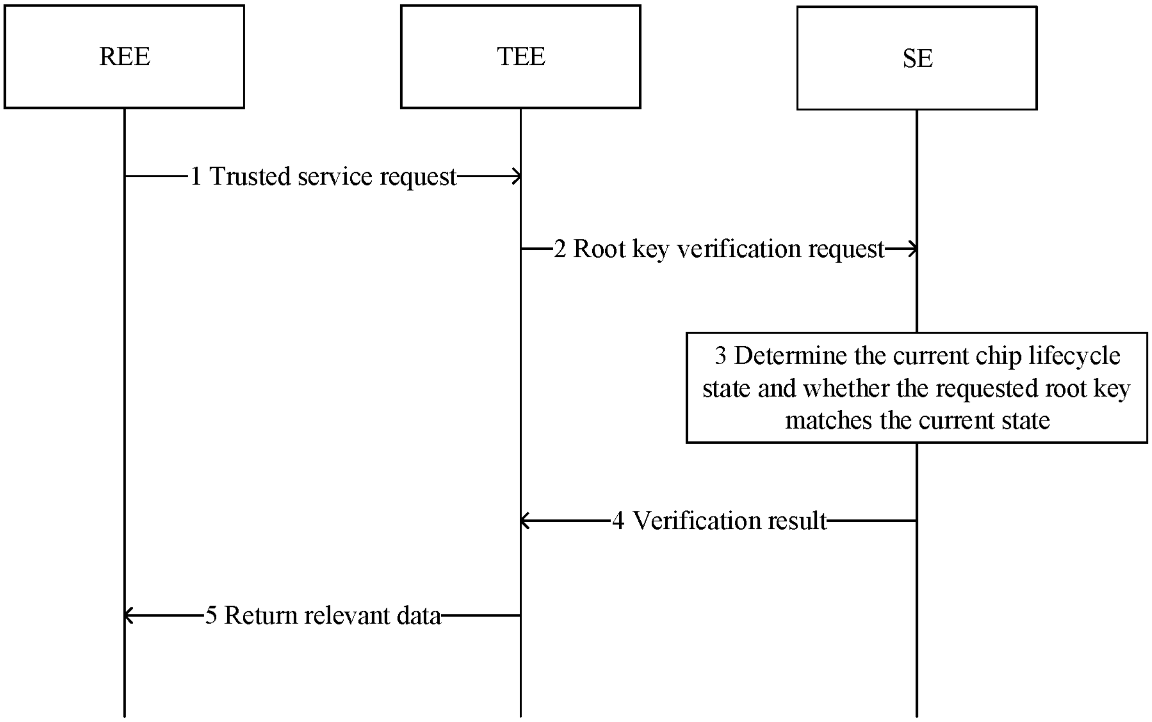
FIG. 5 is a schematic diagram of an application of access control based on the resource management method according to an embodiment of the present disclosure.

FIG. 5 is a flowchart of the resource management method in a payment application scenario. For example, in application scenarios involving payment, basic services such as browsing products, selecting products, and submitting orders may be realized in the REE subsystem first. The REE subsystem may send a trusted service request to the TEE subsystem, such that the business process moves to the TEE subsystem to realize processes such as verifying payment environment, displaying payment information, user inputting the payment key or verifying fingerprints, etc. Next, based on the root key verification request, the TEE subsystem may request the root key stored in the SE subsystem to verify the transaction information, such as requesting the payment root key stored in the SE subsystem to verify the payment key input by the user. In response to the request at S2, the SE subsystem may determine the current chip lifecycle state, such as being in the UM state, and determine whether the requested payment root key access authority matches the current UM state. If the requested payment root key access authority matches the current UM state, access to the root key can be allowed for the corresponding payment verification. The methods of determining whether the access authority of the requested payment root key matches the current UM state may be based on the resource address range, the resource lifecycle state, etc. described above, which will not be repeated here. Next, the SE subsystem may return the verification result to the TEE subsystem, and the TEE subsystem may return the relevant data to the REE subsystem to complete the interaction with the payment center by the REE subsystem. Therefore, the resource management method shown in FIG. 5 can improve the security of the root key based on the lifecycle state of the chip, and avoid the signature operation with potential security risks.

By using the resource management method according to some embodiments of the present disclosure, the security of important resources stored in the SE subsystem can be ensured based on the lifecycle state set for the security architecture system. Further, by implementing the resource management method provided by the embodiments of the present disclosure, important resources such as root keys stored in the SE subsystem can have a higher security level in each lifecycle state of the terminal, thereby avoiding security risks such as leakage of important information.

Further, improving the security of the terminal device is beneficial to enrich the application scenarios of the device. For example, programs with high security requirements can also be installed in personal mobile phones and the corresponding functions can be implemented to ensure user information security and help build a safe and reliable environment for product usage.

Another aspect of the present disclosure further provides a computing device. More specifically, the computing device according to some embodiments of the present disclosure may include a security architecture system. The security architecture system may include a secure element subsystem. The security architecture system may be configured with N chip lifecycle states, where N is an integer greater than 1. The secure element subsystem may store resources, and the access authorities of the resources may be associated with the N chip lifecycle states.

Figure 6:
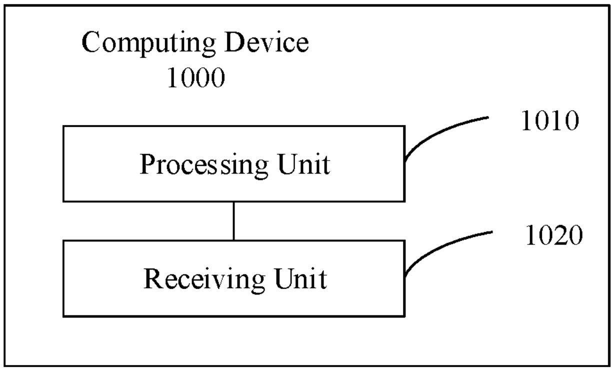
FIG. 6 is a schematic block diagram of a computing device according to an embodiment of the present disclosure.

FIG. 6 is a schematic block diagram of a computing device 1000 according to some embodiments of the present disclosure. As shown in FIG. 6, the computing device 1000 includes a processing unit 1010. The processing unit 1010 may be configured to perform access control on resources based on the chip lifecycle state that the security architecture system is currently in, where the chip lifecycle state that the security architecture system is currently in belonging to one of the N chip lifecycle states.

For example, the computing device may be the mobile terminal described in conjunction with FIG. 2A, and the processing unit 1010 may be the processor 201 of the mobile terminal 200. The processor may be configured to use various interfaces and lines to connect the various functional units of the device, run or execute software programs and/or modules stored in the memory, and call data stored in the memory to perform various functions and process data. In some embodiments, the processing unit 1010 may be implemented as one or more processor cores. For example, the processing unit may integrate an application processor and a modem processor, where the application processor mainly handles the operating system, user interface, and application programs, and the modem processor mainly handles wireless communication. It should be understood that, the modem processor may not be integrated into the processing unit 1010. In some embodiments, the computing device may also be other types of computing devices, such as a desktop computer capable of installing application programs and displaying application icons, a tablet computer, a personal computer (PC), a personal digital assistant (PDA), a smart watch, a netbook, a wearable electronic device, an augmented reality (AR) device, etc. The present disclosure does not limit the specific form of the computing device.

Some functions that can be implemented by units in a computing device according to some embodiments of the present disclosure will be described below.

According to some embodiments of the present disclosure, the computing device 1000 may further include a receiving unit 1020. The receiving unit 1020 may be configured to obtain an access instruction for the resource. In order to control access to the resource, the processing unit 1010 may be configured to determine whether to allow access to the resource based on whether the access authority of the access instruction for the resource match the chip lifecycle state the security architecture system is currently in.

In some embodiments, the receiving unit 1020 may be implemented as a communication line or an interface device for implementing data transmission, which is not limited in the embodiments of the present disclosure. In some embodiments, some or all of the receiving unit 1020 may be integrated in the processing unit.

According to some embodiments of the present disclosure, the security architecture system may include M debugging interfaces, each debugging interface being used to access resources stored in the secure element subsystem, M being an integer greater than or equal to 1. In some embodiments, the receiving unit 1020 may be configured to obtain the access instruction for the resource from a debugging interface belonging to one of the M debugging interfaces, the debugging interface belonging to one of the M debugging interfaces being represented as a current debugging interface.

According to some embodiments of the present disclosure, for each chip lifecycle state in the N chip lifecycle states, a debugging interface allowing resource access in the lifecycle state of the chip may be respectively arranged. In order to control access to the resource, the processing unit 1010 may be configured to allow access to the resource through the current debugging interface in response to the current debugging interface being a debugging interface that is accessible in the current chip lifecycle state of the security architecture system. The processing unit 1010 may also be configured to deny access to the resource through the current debugging interface in response to the current debugging interface not being a debugging interface that is accessible in the current chip lifecycle state of the security architecture system.

According to some embodiments of the present disclosure, for each chip lifecycle state in the N chip lifecycle states, an address range of the resources allowed to be accessed in the chip lifecycle states may be respectively set. In order to control access to the resource, the processing unit 1010 may be configured to allow access to the resource if the resource's address being in the address range of the resource that is allowed to be accessed in the current chip lifecycle state of the security architecture system; and deny access to the resource if the resource's address not being in the address range of the resource that is allowed to be accessed in the current chip lifecycle state of the security architecture system.

According to some embodiments of the present disclosure, N resource lifecycle states may be configured for the resource. The N resource lifecycle states may correspond to the N chip lifecycle states, where the resource may be configured with one or more corresponding resource lifecycle states. In order to control access to the resource, the processing unit 1010 may be configured to allow access to the resource in response to one or more resource lifecycle states corresponding to the resource matching the current chip lifecycle state of the security architecture system; and deny access to the resource if one or more resource lifecycle states corresponding to the resource not matching the current chip lifecycle state of the security architecture system.

According to some embodiments of the present disclosure, the resource may include a plurality of root keys, and the security architecture system may also include a REE subsystem and a TEE subsystem. According to some embodiments of the present disclosure, the receiving unit 1020 of the computing device 1000 may be configured to obtain a key derivation request from the REE subsystem or the TEE subsystem. The key derivation request includes key identifier information, which may be used to request the SE subsystem to perform key derivation by using the root key corresponding to the key identifier information in the plurality of root keys. The processing unit 1010 may be configured to allow key derivation using the root key corresponding to the key identifier information if the access authority for the root key corresponding to the key identifier information matching the current chip lifecycle state of the security architecture system; and deny key derivation using the root key corresponding to the key identifier information if the access authority for the root key corresponding to the key identifier information not matching the current chip lifecycle state of the security architecture system.

According to some embodiments of the present disclosure, the chip lifecycle state that the security architecture system is currently in may be recorded by programming the memory. Accordingly, in the process of using the chip, the currently chip lifecycle state of the security architecture system can be switched in the order of the CM state, the DM state, the UM state, the DM_RMA state, and the CM_RMA state.

According to some embodiments of the present disclosure, the receiving unit 1020 may be configured to obtain a switching instruction for switching the state of the chip lifecycle state that the security architecture system is currently in. The processing unit 1010 may be further configured to perform authority switching verification for the switching instruction, and determine whether to perform state switching based on the result of the authority switching verification.

For the processes performed by the computing device 1000, reference can be made to the resource management method described above in conjunction with the accompanying drawings. It should be understood that, by implementing the processes of the resource management method described above, the computing device provided by the embodiments of the present disclosure can achieve similar technical effects, which will not be repeated here.

Figure 7:
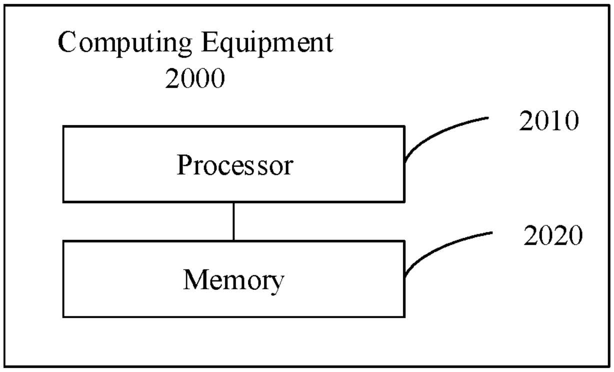
FIG. 7 is a schematic block diagram of a computing equipment according to an embodiment of the present disclosure.

Another aspect of the present disclosure further provides a computing equipment. FIG. 7 is a schematic block diagram of a computing equipment 2000 according to an embodiment of the present disclosure.

As shown in FIG. 7, the computing equipment 2000 includes a processor 2010 and a memory 2020. According to an embodiment of the present disclosure, computer-readable codes can be stored in the memory 2020. When the computer-readable codes stored in the memory 2020 that, when executed by the processor 2010, can implement the resource management method described above.

The processor 2010 may be configured to perform various actions and processes according to the programs stored in the memory 2020, thereby realizing or executing various methods, processors, and logical block diagrams provided by the embodiments of the present disclosure. Specifically, the processor 2010 may be an integrated circuit chip having signal processing capabilities. The processor may be a general-purpose processor, a digital signal processor (DSP), an application specific integrated circuit (ASIC), a ready-made programmable gate array (FPGA) or other programmable logic devices, a discrete gate or a transistor logic device, and a discrete hardware component. The general-purpose processor may be a microprocessor, or the processor may also be any conventional processor, etc., and can be X86 architecture or ARM architecture, etc.

The memory 2020 can store computer executable instruction codes which are used to implement the key management method according to the embodiments of the present disclosure when executed by the processor 2010. Specifically, the memory 2020 may be a volatile memory, a nonvolatile memory, or may include both volatile memory and nonvolatile memory. Nonvolatile memory may be read-only memory (ROM), programmable read-only memory (PROM), erasable programmable read-only memory (EPROM), electrically erasable programmable read-only memory (EEPROM), or flash memory. The volatile memory may be a random-access memory (RAM), which is used as an external cache. Many forms of RAMs are available, such as static random-access memory (SRAM), dynamic random-access memory (DRAM), synchronous dynamic random-access memory (SDRAM), double data rate synchronous dynamic random-access memory (DDRSDRAM), enhanced synchronous dynamic random-access memory (ESDRAM), synchronously connected dynamic random-access memory (SLDRAM) and direct memory bus random-access memory (DR RAM). It should be noted that the memory of the method described herein is intended to include, but not be limited to, these and any other suitable types of memories.

Figure 8:
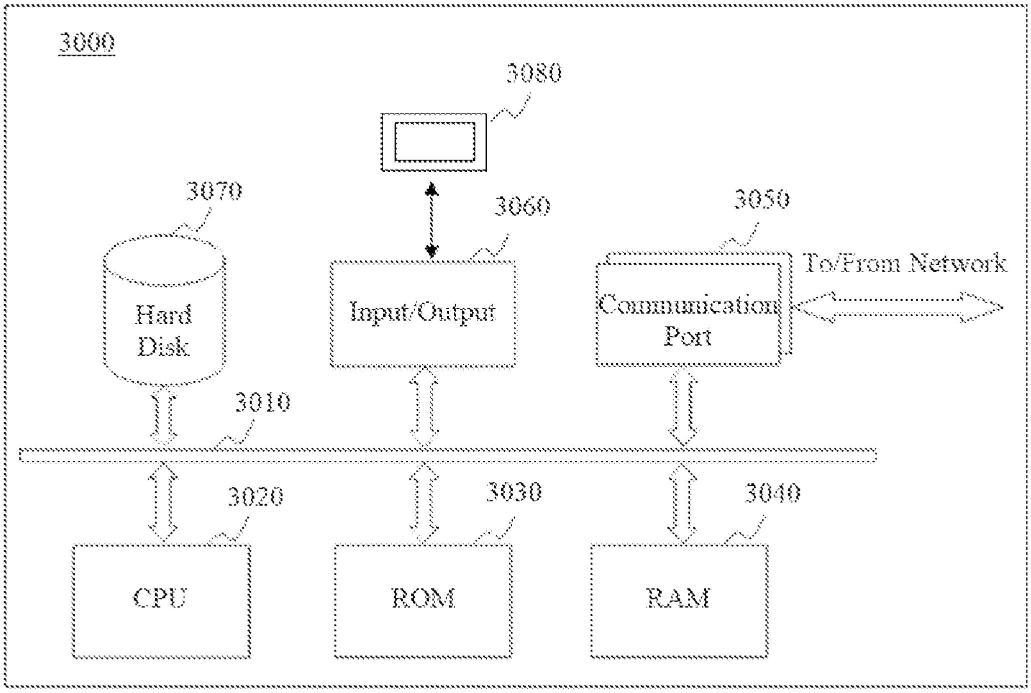
FIG. 8 is a schematic diagram of an architecture of the computing equipment according to an embodiment of the present disclosure.

The resource management method or resource management device according to the embodiments of the present disclosure may also be implemented by means of an architecture of a computing equipment 3000 shown in FIG. 8. As shown in FIG. 8, the computing equipment 3000 may include bus 3010, one or more CPUs 3020, read-only memory (ROM) 3030, random access memory (RAM) 3040, communication port 3050 connected to the network, input/output component 3060, hard disk 3070, etc. The storage device in the computing equipment 3000, such as ROM 3030 or hard disk 3070, may store various data or files used for processing and/or communication of the resource management method provided by the present disclosure, as well as program instructions executed by the CPU. The computing equipment 3000 may also include a user interface 3080.

The architecture shown in FIG. 8 is only exemplary, when implementing different devices, one or more components of the computing device shown in FIG. 8 may be omitted according to the system requirements. In some embodiments, the computing equipment 3000 described above may be implemented as a mobile terminal installed with an application program, and the security architecture system of the mobile terminal may include the SE subsystem. By implementing the resource management method described above, important resources such as root keys stored in the SE subsystem can have a higher security level in each lifecycle state of the terminal, thereby avoiding potential security risks such as leakage of important information.

Further, improving the security of the terminal device is beneficial to enrich the application scenarios of the device. For example, programs with high security requirements can also be installed in personal mobile phones and the corresponding functions can be implemented to ensure user information security and help build a safe and reliable environment for product usage.

Figure 9:
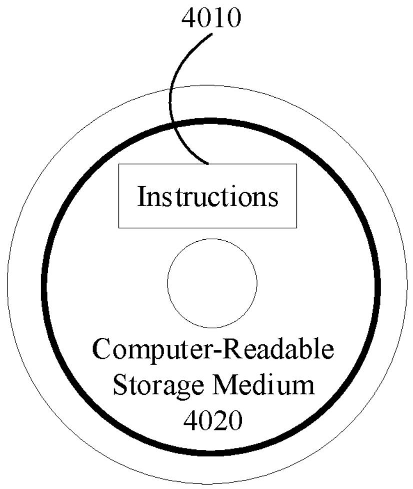
FIG. 9 is a schematic diagram of a non-transitory computer-readable storage medium according to an embodiment of the present disclosure.

Another aspect of the present disclosure further provides a non-transitory computer-readable storage medium. FIG. 9 is a schematic diagram of a non-transitory computer-readable storage medium 4020 according to an embodiment of the present disclosure.

As shown in FIG. 9, instructions, such as computer-readable instructions 4010 can be stored in the non-transitory computer-readable storage medium 4020. The computer-readable instructions 4010, when executed by a processor, can perform the resource management method described in the foregoing embodiments. The computer-readable storage medium may include, but is not limited to, volatile memory and/or non-volatile memory. The volatile memory may include random-access memory (RAM) and/or cache memory, etc., and the non-volatile memory may include read-only memory (ROM), hard disk, flash memory, etc. In some embodiments, the computer-readable storage medium 4020 may be connected to a computing device such as a computer, and then, with the computing device running the computer-readable instructions 4010 stored on the computer-readable storage medium 4020, the resource management method described above can be performed.

Another aspect of the present disclosure further provides a computer program product or a computer program. The computer program product or the computer program includes computer-readable instructions stored in a computer-readable storage medium. The processor of the computer device can read the computer-readable instructions from the computer-readable storage medium, and the processor can execute the computer-readable instructions, such that the computer device can execute the resource management method described in the foregoing embodiments.

Consistent with the present disclosure, by associating the access authority of the resource with the set chip lifecycle state, access to the resource can be controlled based on the chip lifecycle state that the security architecture system is currently in. Accordingly, important resources such as root keys stored in the SE subsystem have a higher level of security in each life stage of the product, thereby avoiding security risks such as leakage of important information.

Those skilled in the art can understand that the content disclosed in the present disclosure can have various modifications and improvements. For example, the various devices or components described above can be implemented by hardware, or can be implemented by software, firmware, or a combination of some or all of them.

Furthermore, although the present disclosure makes various references to certain units in the system according to the embodiments of the present disclosure, any number of different units can be used and run on the client and/or server. The unit is merely illustrative and different units can be used for different aspects of the system and method.

Flowcharts are used in the present disclosure to illustrate the steps of methods provided by the embodiments of the present disclosure. It is to be expressly understood that, the preceding or following steps may or may not be implemented in exact order. Conversely, the steps may be performed in inverted order, or simultaneously. In addition, one or more other steps may be added to the flowcharts.

Those of ordinary skill in the art can understand that all or part of the steps in the above method can be completed by instructing relevant hardware through a program, and the program can be stored in a computer-readable storage medium, such as a read-only memory, a magnetic disk, or an optical disk, etc. In some embodiments, all or part of the steps of the foregoing embodiments can also be implemented using one or more integrated circuits. Accordingly, each module/unit in the foregoing embodiments can be implemented in the form of hardware or can be implemented in the form of software functional modules. The present disclosure is not limited to the combination of hardware and software in any particular form.

Unless defined otherwise, all terms (including technical and scientific terms) used here have the same meaning as those commonly understood by those of ordinary skill in the art to which this disclosure belongs. It should also be understood that terms such as those defined in ordinary dictionaries should be interpreted as having meanings which are consistent with their meanings in the context of the relevant technology and should not be interpreted in ideal or extremely formal meanings, unless explicitly defined as such here.

The above is an illustration of the present disclosure and should not be considered as a limitation thereof. Although several exemplary embodiments of the present disclosure are described, it will be easy for those skilled in the art to understand that many modifications can be made to the exemplary embodiments without departing from the novel teaching and advantages of the present disclosure. Therefore, all these modifications are intended to be included in the scope of the present disclosure as defined in the claims. It should be understood that the above is an illustration of the present disclosure and should not be considered as being limited to the particular embodiments disclosed, and modifications to the disclosed embodiments and other embodiments are intended to be included in the scope of the appended claims. The present disclosure is limited by the claims and their equivalents.

What is claimed is:

1. A resource management method implemented by a security architecture system including a secure element subsystem storing at least an important resource, the security architecture system being configured with N chip lifecycle states including at least a chip manufacturing state, a chip manufacturing return state, a device manufacturing state, a device manufacturing return state, and a user management state, N being an integer greater than 1, an access authority of accessing the important resource being associated with each of the N chip lifecycle states respectively, the method comprising:

based on a current chip lifecycle state of the security architecture system, assigning an access authority for accessing the secure element subsystem to each of M debugging interfaces for testing and debugging a chip, M being an integer greater than 1;

obtaining a switching instruction for switching the current chip lifecycle state of the security architecture system; and performing switching authority verification for the switching instruction, and determining whether to perform state switching based on a result of the switching authority verification;

wherein:

in response to the current chip lifecycle state being the chip manufacturing state or the chip manufacturing return state, the access authority assigned to each of the M debug interface allows each of M debugging interfaces to access the secure element subsystem;

in response to the current chip lifecycle state being the device manufacturing state or the device manufacturing return state, the access authority assigned to each of the M debug interface allows each of M debugging interfaces to access the secure element subsystem except for a chip manufacturer root key stored in the secure element subsystem; and in response to the current chip lifecycle state being the user management state, the access authority assigned to each of M debug interface denies any of the M debugging interfaces to access the secure element subsystem.

2. The method of claim 1, further comprising:

obtaining an access instruction for the important resource, and determining whether to allow access to the important resource based on whether an access authority of the access instruction for the important resource matches the current chip lifecycle state of the security architecture system.

3. The method of claim 2, wherein:

the security architecture system includes the M debugging interfaces, each debugging interface being used to access resources stored in the secure element subsystem, M being an integer greater than or equal to 1; and obtaining the access instruction for the important resource includes:

obtaining the access instruction for the important resource from a debugging interface belonging to one of the M hardware debugging interfaces, the debugging interface belonging to one of the M hardware debugging interfaces being a current debugging interface.

4. The method of claim 1, further comprising:

for each of the five chip lifecycle states, setting an address range of resources in the secure element subsystem allowed to be accessed, respectively;

in response to the address range of the resources in the secure element subsystem allowed to be accessed being accessed in the current chip lifecycle state, allowing the resources to be accessed; and in response to the access range of the resources in the secure element subsystem not allowed to be accessed being accessed in the current chip lifecycle state, denying the resources to be accessed.

5. The method of claim 1, further comprising:

for each of the N chip lifecycle states, setting the important resource in the secure element subsystem allowed to be accessed, respectively;

in response to the important resource in the secure element subsystem allowed to be accessed being accessed in the current chip lifecycle state, allowing the important resource to be accessed; and in response to the important resource in the secure element subsystem not allowed to be accessed being accessed in the current chip lifecycle state, denying the important resource to be accessed.

6. The method of claim 1, wherein the important resource includes a plurality of root keys, the method further comprising:

obtaining a key derivation request from a rich execution environment subsystem or a trusted execution environment subsystem in the security architecture system, the key derivation request including key identifier information for requesting the secure element subsystem to perform key derivation using a root key corresponding to the key identifier information in the plurality of root keys;

determining whether the key derivation request is allowed in the current chip lifecycle state;

in response to the key derivation request being allowed in the current chip lifecycle state, performing the key derivation using the root key corresponding to the key identifier information; and in response to the key derivation request not being allowed in the current chip lifecycle state, not performing the key derivation using the root key corresponding to the key identifier information.

7. The method of claim 1, wherein:

the current chip lifecycle state of the security architecture system is recorded by programming a one-time memory for the current chip lifecycle state of the security architecture system to switch sequentially in the order of the chip manufacturing state, the device manufacturing state, the user management state, the chip manufacturing return state, and the device manufacturing return state.

8. A computing device configured with a security architecture system including a secure element subsystem storing at least an important resource, the security architecture system being configured with N chip lifecycle states including at least a chip manufacturing state, a chip manufacturing return state, a device manufacturing state, a device manufacturing return state, and a user management state, N being an integer greater than 1, an access authority of accessing the important resource being associated with each of the N chip lifecycle states respectively, the computing device comprising:

a memory storing program instructions;

a receiver configured to obtain a switching instruction for switching a current chip lifecycle state of the security architecture system; and a processor coupled to the memory, when being executed by the processor, the program instructions causing the processor to:

based on the current chip lifecycle state of the security architecture system, assign an access authority for accessing the secure element subsystem to each of M debugging interfaces for testing and debugging a chip, M being an integer greater than 1; and perform switching authority verification for the switching instruction, and determine whether to perform state switching based on a result of the switching authority verification;

wherein:

in response to the current chip lifecycle state being the chip manufacturing state or the chip manufacturing return state, the access authority assigned to each of the M debug interface allows each of M debugging interfaces to access the secure element subsystem;

in response to the current chip lifecycle state being the device manufacturing state or the device manufacturing return state, the access authority assigned to each of the M debug interface allows each of M debugging interfaces to access the secure element subsystem except for a chip manufacturer root key stored in the secure element subsystem; and in response to the current chip lifecycle state being the user management state, the access authority assigned to each of M debug interface denies any of the M debugging interfaces to access the secure element subsystem.

9. The computing device of claim 8 further comprising:

a receiver, the receiving unit being configured to obtain an access instruction for the important resource, wherein the processor is configured to:

determine whether to allow access to the important resource based on whether an access authority of the access instruction for the important resource matches the current chip lifecycle state of the security architecture system.

10. The computing device of claim 9, wherein:

the security architecture system includes M debugging interfaces, each debugging interface being used to access resources stored in the secure element subsystem, M being an integer greater than or equal to 1; and the receiver is further configured to:

obtain the access instruction for the important resource from a debugging interface belonging to one of the M debugging interfaces, the debugging interface belonging to one of the M debugging interfaces being a current debugging interface.

11. The computing device of claim 8, wherein the processor is further configured to:

for each of the five chip lifecycle states, set an address range of resources in the secure element subsystem allowed to be accessed, respectively;

in response to the address range of the resources in the secure element subsystem allowed to be accessed being accessed in the current chip lifecycle state, allow the resources to be accessed; and in response to the access range of the resources in the secure element subsystem not allowed to be accessed being accessed in the current chip lifecycle state, deny the resources to be accessed.

12. The computing device of claim 8, wherein the processor is further configured to:

for each of the N chip lifecycle states, set the important resource in the secure element subsystem allowed to be accessed, respectively;

in response to the important resource in the secure element subsystem allowed to be accessed being accessed in the current chip lifecycle state, allow the important resource to be accessed; and in response to the important resource in the secure element subsystem not allowed to be accessed being accessed in the current chip lifecycle state, deny the important resource to be accessed.

13. The computing device of claim 12, wherein the important resource includes a plurality of root keys, and the processor is further configured to:

obtain a key derivation request from a rich execution environment subsystem or a trusted execution environment subsystem in the security architecture system, the key derivation request including key identifier information for requesting the secure element subsystem to perform key derivation using a root key corresponding to the key identifier information in the plurality of root keys;

determine whether the key derivation request is allowed in the current chip lifecycle state;

in response to the key derivation request being allowed in the current chip lifecycle state, perform the key derivation using the root key corresponding to the key identifier information; and in response to the key derivation request not being allowed in the current chip lifecycle state, not perform the key derivation using the root key corresponding to the key identifier information.

14. The computing device of claim 8, wherein:

the current chip lifecycle state of the security architecture system is recorded by programming a one-time memory for the current chip lifecycle state of the security architecture system to switch sequentially in the order of the chip manufacturing state, the device manufacturing state, the user management state, the chip manufacturing return state, and the device manufacturing return state.

15. A computing equipment, including a security architecture system including a secure element subsystem storing at least an important resource, the security architecture system being configured with N chip lifecycle states including at least a chip manufacturing state, a chip manufacturing return state, a device manufacturing state, a device manufacturing return state, and a user management state, N being an integer greater than 1, an access authority of accessing the important resource being associated with each of the N chip lifecycle states respectively, the computing equipment comprising:

a processor; and a memory storing computer-readable program instructions that, when being executed by the processor, cause the processor to:

based on a current chip lifecycle state of the security architecture system, assign an access authority for accessing the secure element subsystem to each of M debugging interfaces for testing and debugging a chip, M being an integer greater than 1;

obtain a switching instruction for switching the current chip lifecycle state of the security architecture system; and perform switching authority verification for the switching instruction, and determine whether to perform state switching based on a result of the switching authority verification;

wherein:

in response to the current chip lifecycle state being the chip manufacturing state or the chip manufacturing return state, the access authority assigned to each of the M debug interface allows each of M debugging interfaces to access the secure element subsystem;

in response to the current chip lifecycle state being the device manufacturing state or the device manufacturing return state, the access authority assigned to each of the M debug interface allows each of M debugging interfaces to access the secure element subsystem except for a chip manufacturer root key stored in the secure element subsystem; and in response to the current chip lifecycle state being the user management state, the access authority assigned to each of M debug interface denies any of the M debugging interfaces to access the secure element subsystem.

16. A non-transitory computer-readable storage medium comprising:

instructions stored in the non-transitory computer-readable storage medium that, when being executed by a processor, cause the processor to perform a resource management method suitable for a security architecture system, the security architecture system including a rich execution environment subsystem, a trusted execution environment subsystem, and a secure element subsystem, wherein the processor is configured to:

based on a current chip lifecycle state of the security architecture system, assign an access authority for accessing the secure element subsystem to each of M debugging interfaces for testing and debugging a chip, M being an integer greater than 1;

obtain a switching instruction for switching the current chip lifecycle state of the security architecture system; and perform switching authority verification for the switching instruction, and determine whether to perform state switching based on a result of the switching authority verification;

wherein:

in response to the current chip lifecycle state being the chip manufacturing state or the chip manufacturing return state, the access authority assigned to each of the M debug interface allows each of M debugging interfaces to access the secure element subsystem;

in response to the current chip lifecycle state being the device manufacturing state or the device manufacturing return state, the access authority assigned to each of the M debug interface allows each of M debugging interfaces to access the secure element subsystem except for a chip manufacturer root key stored in the secure element subsystem; and in response to the current chip lifecycle state being the user management state, the access authority assigned to each of M debug interface denies any of the M debugging interfaces to access the secure element subsystem.

* * * * *